July 28, 1970 D. J. CAMPBELL 3,522,358
RHYTHMIC INTERPOLATORS
Filed Feb. 28, 1967 7 Sheets-Sheet 2

INVENTOR
DONALD J. CAMPBELL
ATTORNEYS

July 28, 1970  D. J. CAMPBELL  3,522,358
RHYTHMIC INTERPOLATORS

Filed Feb. 28, 1967  7 Sheets-Sheet 4

INVENTOR
DONALD J. CAMPBELL
BY William H. Brewing, Agent
Hurtz, Rose & Greene
ATTORNEYS

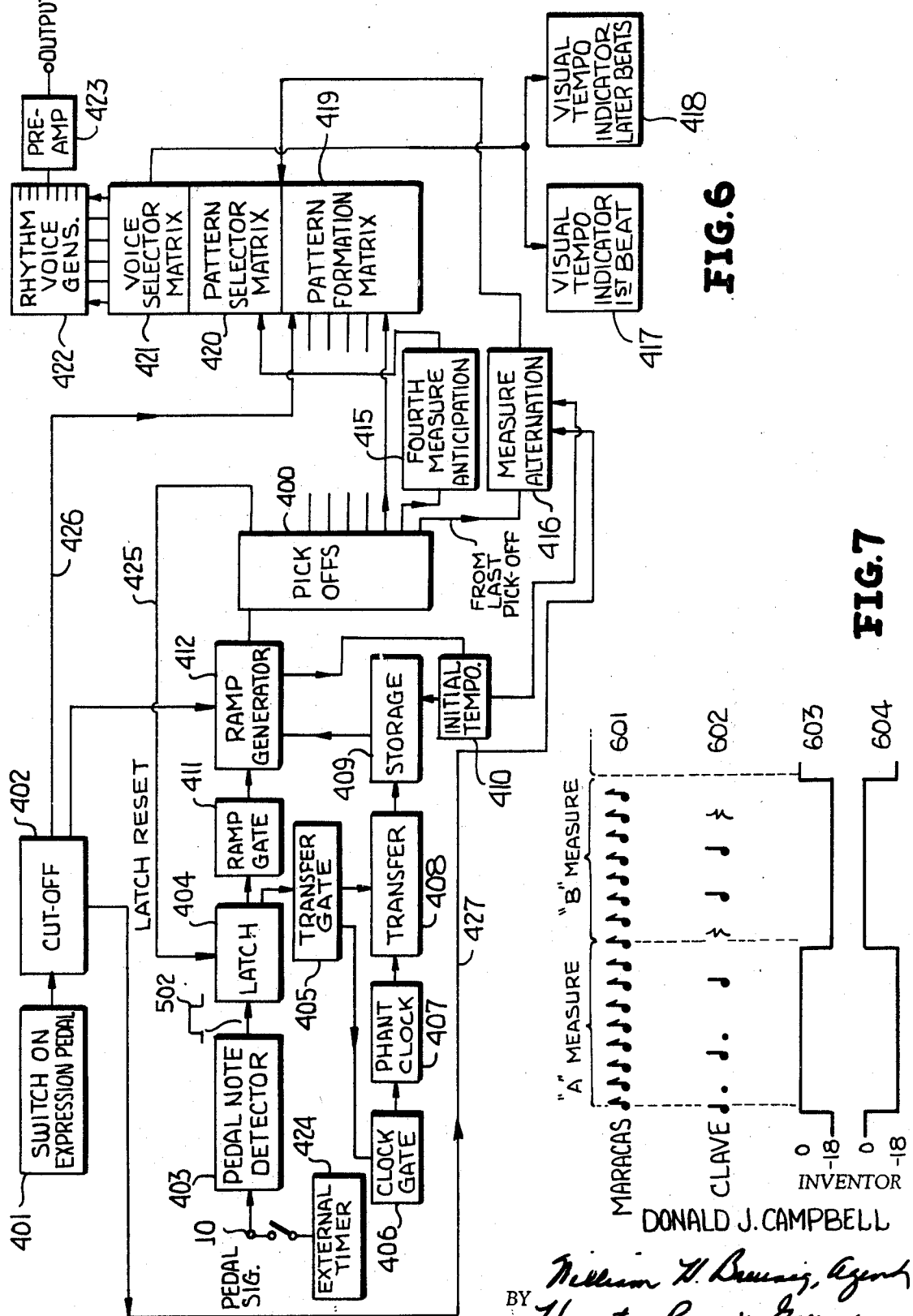

July 28, 1970 D. J. CAMPBELL 3,522,358
RHYTHMIC INTERPOLATORS
Filed Feb. 28, 1967 7 Sheets-Sheet 7
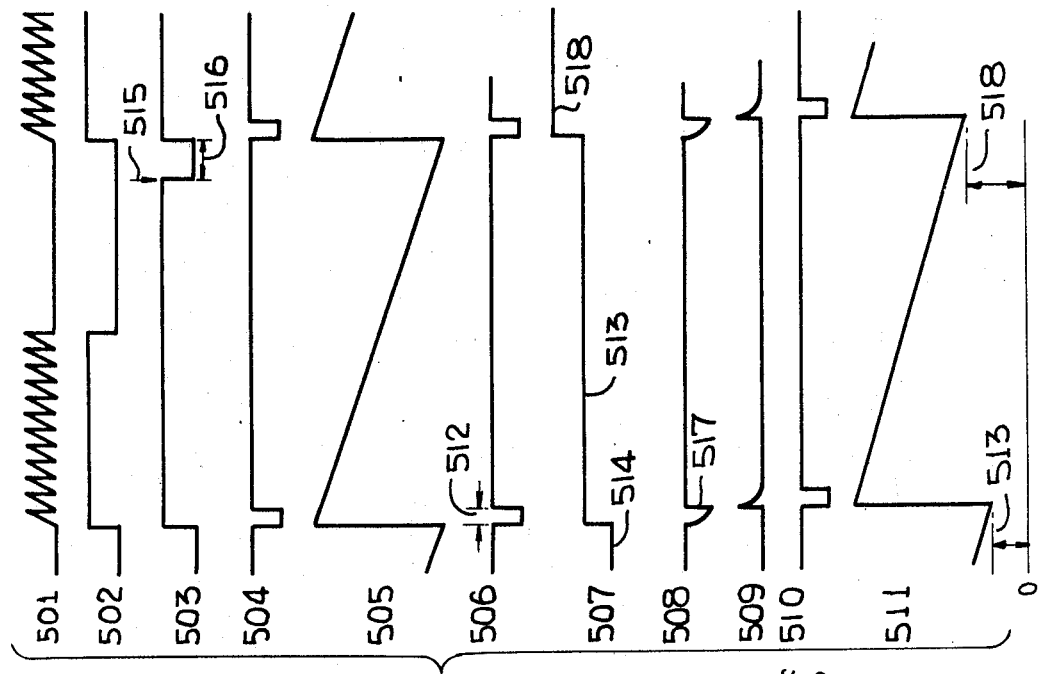
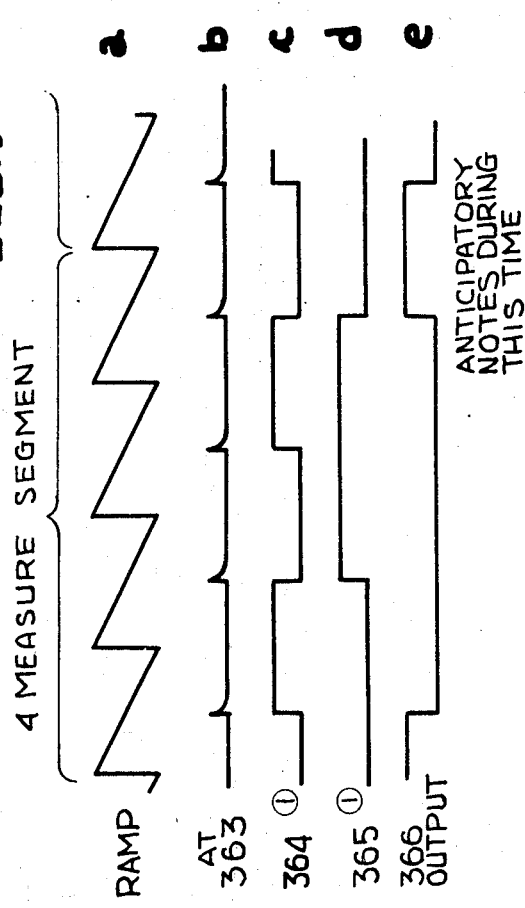
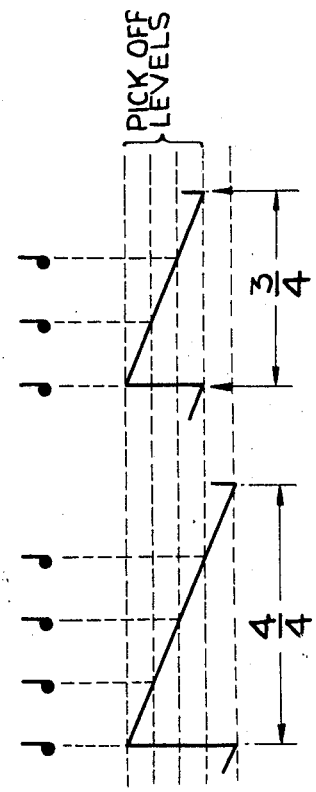
INVENTOR
DONALD J. CAMPBELL
BY
ATTORNEYS

United States Patent Office 3,522,358
Patented July 28, 1970

3,522,358
RHYTHMIC INTERPOLATORS
Donald J. Campbell, Cincinnati, Ohio, assignor to D. H. Baldwin Company, Cincinnati, Ohio, a corporation of Ohio
Filed Feb. 28, 1967, Ser. No. 619,381
Int. Cl. G10f *1/00;* G10h *1/02*
U.S. Cl. 84—1.03          24 Claims

ABSTRACT OF THE DISCLOSURE

A system for development of rhythmic patterns in which repetitive ramp wave forms are developed, the repetition rate of which is controlled, pulses being developed by sampling the ramp wave forms at predetermined levels, certain of the pulses being selected by means of a matrix to form each required pattern. The minima and maxima of the ramps are maintained at fixed levels and the slopes of the ramps are conformed to the desired repetition rates in accordance with the tempo of a player controlled instrument, such as an electric organ. Provision is made for extending rhythm patterns over two measures, each different from the other, for inserting additional beats near the end of each forth measure of a piece of music, provision of visual tempo indication, and provision of a cutoff for instant abortion of the presently played measure, allowing rapid changes of tempo.

BACKGROUND OF THE INVENTION

Rhythmic accompaniment systems are well known. Certain of these are free running, i.e., they are not synchronized with or slaved to the playing of a musical instrument, but rather the player must conform his tempo to the accompaniment. Other such systems perform in measures of accompaniment, the initiation of each measure occurring in response to an action by the player of the accompanied instrument, or the tempo of each measure being caused to conform to the tempo established by the player. The latter influence may be of two types, automatic or semi-automatic. The automatic type of accompaniment device automatically conforms its measure in respect to initiation and duration, to the instrument accompanied. A semi-automatic type of accompaniment device performs its measures automatically in respect to initiation only, and sets its measure durations automatically. The present system is of the fully automatic type. However, certain of its features may be eliminated, to provide a semi-automatic system, and certain other features may be omitted to provide a free running system.

SUMMARY OF THE INVENTION

Briefly describing the present system in its broad aspects, a series of pedal signals is derived from an electric organ, or other timing signals may be employed. These are converted to a voltage level representative of a duration of each measure of music as it occurs. An initial tempo circuit is provided to preset the voltage level representative of measure duration, for the first measure. The measured or preset voltage level is used to control the slope of a further ramp voltage, so that it follows the path between two preset values and therefore subsists for a time corresponding to the duration of each measure of music.

Pick-offs are provided which produce sharp pulses for preset voltage levels along the ramp. Thereby a sequence of pulses may be generated which occur in a desired pattern, or which occur sequentially in equal time divisions. These pulses are individually applied to horizontal leads of a matrix, and a plurality of vertical leads are provided which are selectively connected to the horizontal leads by resistors, so that on each one of the vertical leads is generated a rhythmic sequence composed of selected ones of the pick-off voltages provided to the horizontal lines. The matrix also contains a series of leads which are connected individually to voice generators, such as clave, etc. The vertical lines which carry the rhythmic pulse sequences may be connected to the voice generator lines by means of diode switches, which normally maintain an open circuit, but which may be converted to close circuit or closed switch condition in response to control voltages. The latter may be applied by means of a selective manual switch.

Some frequently encountered rhythm pattern extend over two measures. In a given pattern the musical part played by one rhythm pattern may be the same for all measures while another voice in the same pattern may have a part two measures long. For example, in one typical rhumba pattern the musical part played by the maracas is the same for all measures but the part played by the clave is two measures long, having an A measure and a B measure, which are different, and which alternate throughout the playing. In accordance with the invention, provision is made for playing rhythms in alternation automatically, this specifically implying the connection of two rhythmic pulse carrying vertical leads of the matrix alternately to a given voice generator lead, each connection enduring for one measure.

The provision of measure alternation facilities implies that the measure alternation system must be in a present state when the musician commences to play, so that the proper first measure always occurs first.

A further provision of the present system relates to fourth measure anticipation. Fourth measure anticipation operates to insert additional beats near the end of each fourth measure of the piece of music. Popular music frequently is made up of four measure segments and drummers sometimes insert an extra beat or a small flourish at the end of each four-measure segment which anticipates or leads up to the next segment.

A further provision of the present invention relates to visual tempo indication. This facility provides a visual indication of the beats of the pattern being generated. Two indicators are provided, one of which indicates the first beat of each measure, and the other of which indicates all the remaining beats.

It is essential to provide the organist with means for stopping the device at any time he wishes. Most popular music ends on an accented pedal note and a measure of rhythm accompaniment following this note is not desired. Nevertheless it will be produced by the device of the invention if the organist is not provided with a device for stopping the automatic rhythm accompaniment immediately after this final pedal note. It is not adequate merely to cut off the audio signals, because it is desired to additionally provide for both rapid tempo changes and rhythmic breaks, the latter being useful in avoiding monotony of rhythm. Slow changes in tempo are provided for in the normal operation of the device, but there are occasions when the organist wishes suddenly to make a large change in tempo. Rhythmic breaks occur when the organist either stops playing completely or desire to play without any rhythmic accompaniment for a time. A frequently heard example of this is the omission of rhythmic accompaniment during the pick-up of a popular song. The pick-up of a song is the introductory notes of the melody leading up to the first accented note of the melody. Omission of rhythm accompaniment during pick-up at the beginning of the play is provided because no pedal note is played until the accepted melody note occurs.

However, when the melody repeats, it may be desirable to omit rhythmic accompaniment during the pick-up period.

The above objectives are achieved by the cut-off device which aborts the present measure at the instant the cut-off device is actuated, and instantly places the system of the invention in its initial tempo condition. This arrangement provides for rapid temo changes by allowing the organist, while playing, to set the new tempo on the initial tempo control at any time that he has a free hand available for this purpose. This will have no effect during play because initial tempo is not in effect while the organist is playing. At the instant before the first pedal note of the new tempo the organist momentarily actuates cutoff, which places the system of the invention instantly in initial tempo condition, whereupon the next pedal note initiates rhythm accompaniment in the new tempo. This same procedure provides for rhythmic breaks, in which case the initial tempo setting may be the same as the tempo being played, i.e., it is then not necessary to change tempo. Cutoff may be actuated for a period of time either while playing to omit rhythmic accompaniment, or during a pause in playing.

A second mode of operation of cutoff is provided, wherein in addition to the present measure being aborted and an initial tempo being instantly turned on, as in the first mentioned mode, each pedal note played while cut-off is actuated produces the same rhythmic sound as does the first beat of the pattern. Stated in other words, the automatic cutoff device is instantly converted to a pedal stop having an appropriate rhythm accompaniment voice. This mode of operation is useful in breaks and is especially useful in the endings of songs. Near the end of most popular pieces the rhythmic accompaniment changes from a regular pattern to an ending pattern which may consist entirely of accented notes, and these notes are usually played on the organ pedals. In accordance with the invention, the organist actuates cutoff just before the first pedal note of the ending section of the music played and normal pedal playing then produces the desirable rhythmic accompaniment ending.

A wide variety of rhythmic voice generators may be employed. Without intending any limitation thereby the present invention may provide for long brush, short brush, long maracas, short maracas, cowbell, high timbale, low timbale and clave. Brush and maracas are similar sounds and it is unlikely that both would be required in the same pattern so that only one basic generator is provided for these two voices and its output is selectively controlled to produce either the brush or the maracas sounds. The brush and the maracas sounds are controlled by a phantastron sawtooth generator, which has a slope which is a function both of the setting of the panel control relating to tempo, as well as a function of the tempo of the device as reflected by the stored control voltage representative of the duration of a measure. Controlling the slope of the sawtooth generator in this manner allows the organist to control the length of the brush or maracas stroke by manual control, but at the same time automatically prevents the sounds from becoming blurred or indistinct due to overlapping, when the tempo increases, as would occur if the stroke length were constant without regard to tempo.

It is accordingly a broad object of the present invention to provide a novel rhythmic accompaniment instrument.

It is another object of the present invention to provide the rhythmic accompaniment instrument which is capable of following the playing of an organist or other instrumentalist automatically.

Still another object of the invention involves the provision of automatic measure alternation in rhythmic accompaniments, i.e., the automatic playing of two rhythm patterns which occur in alternate measures of the music, without requiring manipulation by the player except in terms of selection of the measure alternation facility.

Still another object of the invention relates to expedients utilized to control the total range of tempos available to the instrument where these are selected in terms of slope of a single ramp generator.

Another feature of the present invention relates to fourth measure anticipation, which operates to insert additional beats near the end of each fourth measure of a musical selection, without requiring the interposition of the musician.

Still another object of the invention relates to the visual tempo devices which provide the musician with a visual indication of the occurrence of each initial beat of a measure, as well as visual indication on a separate device of all beats subsequent to the first beat of the measure.

Another feature of the invention relates to the provision of cutoff facilities which enable the organist to cut off the rhythmic accompaniment at any time during play, during such cutoff to insert a new rhythm, thus allowing the organist, while playing, to set the new tempo at any time that he has a free hand, cutoff then taking effect in response to pedal motion of the musician, and also allowing the organist to cut off the rhythmic accompaniment device in order to enable the player to produce the same rhythmic sound as does the first beat of a pattern in response to each subsequent pedal actuation.

Another feature of the invention relates generally to the provision of a common brush and maracas circuit, which provides brush or maracas strokes of durations which are automatically controlled in accordance with the tempo of the music being played so that an overlap of strokes cannot occur to produce blurred or indistinct interpolated sounds.

BRIEF DESCRIPTION OF THE DRAWINGS

FIG. 6 is a block diagram of the present system conforming generally to the schematic circuit diagram of FIGS. 1–3, inclusive; and FIGS. 7–10 are waveform diagrams showing waveforms occurring in the performance of the system of FIGS. 1–6, inclusive.

DESCRIPTION OF A PREFERRED EMBODIMENT

Figure 1:
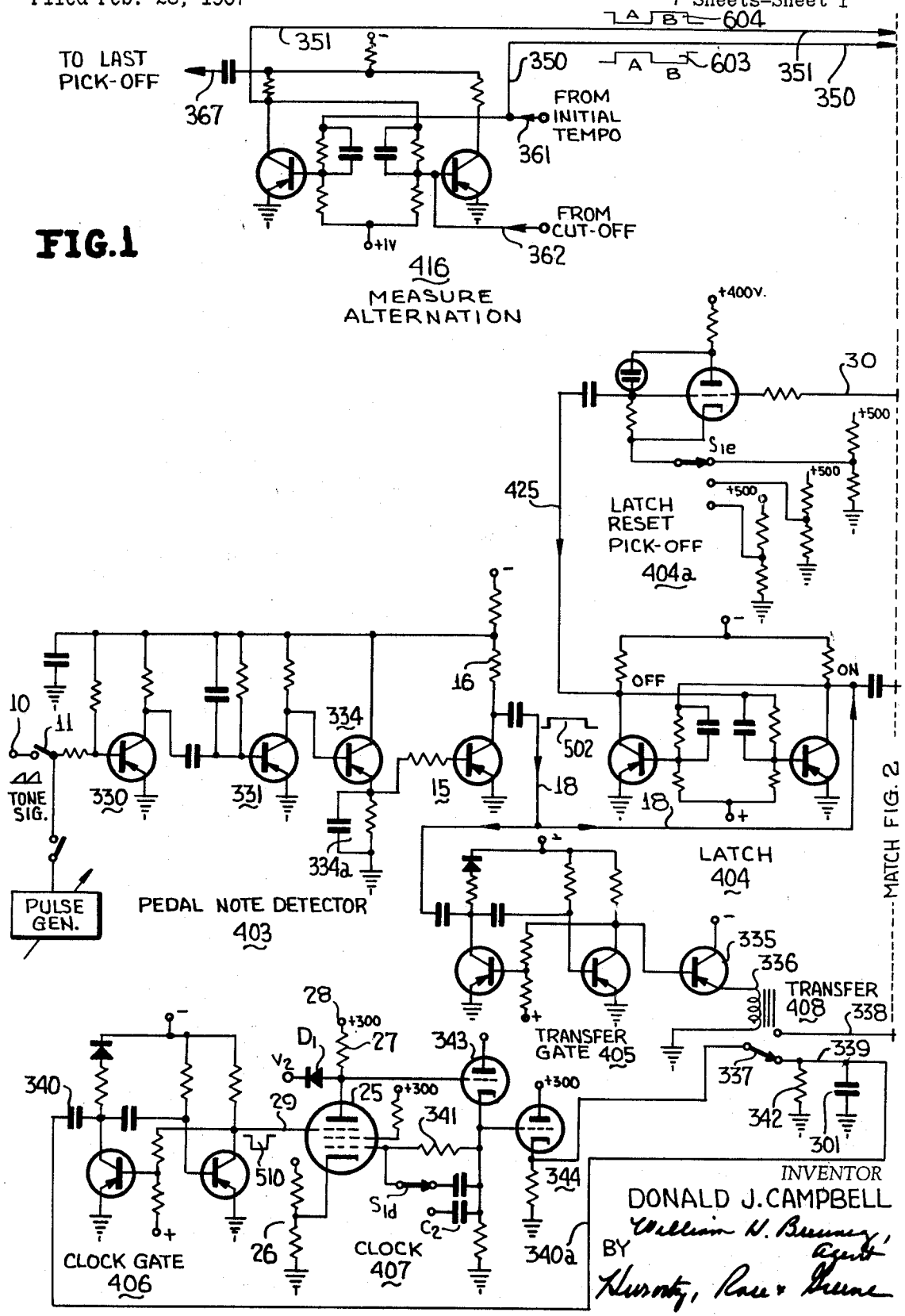
FIG. 1, FIG. 2, and FIG. 3 taken together are schematic circuit diagrams of a preferred embodiment of the invention.
Figure 2:
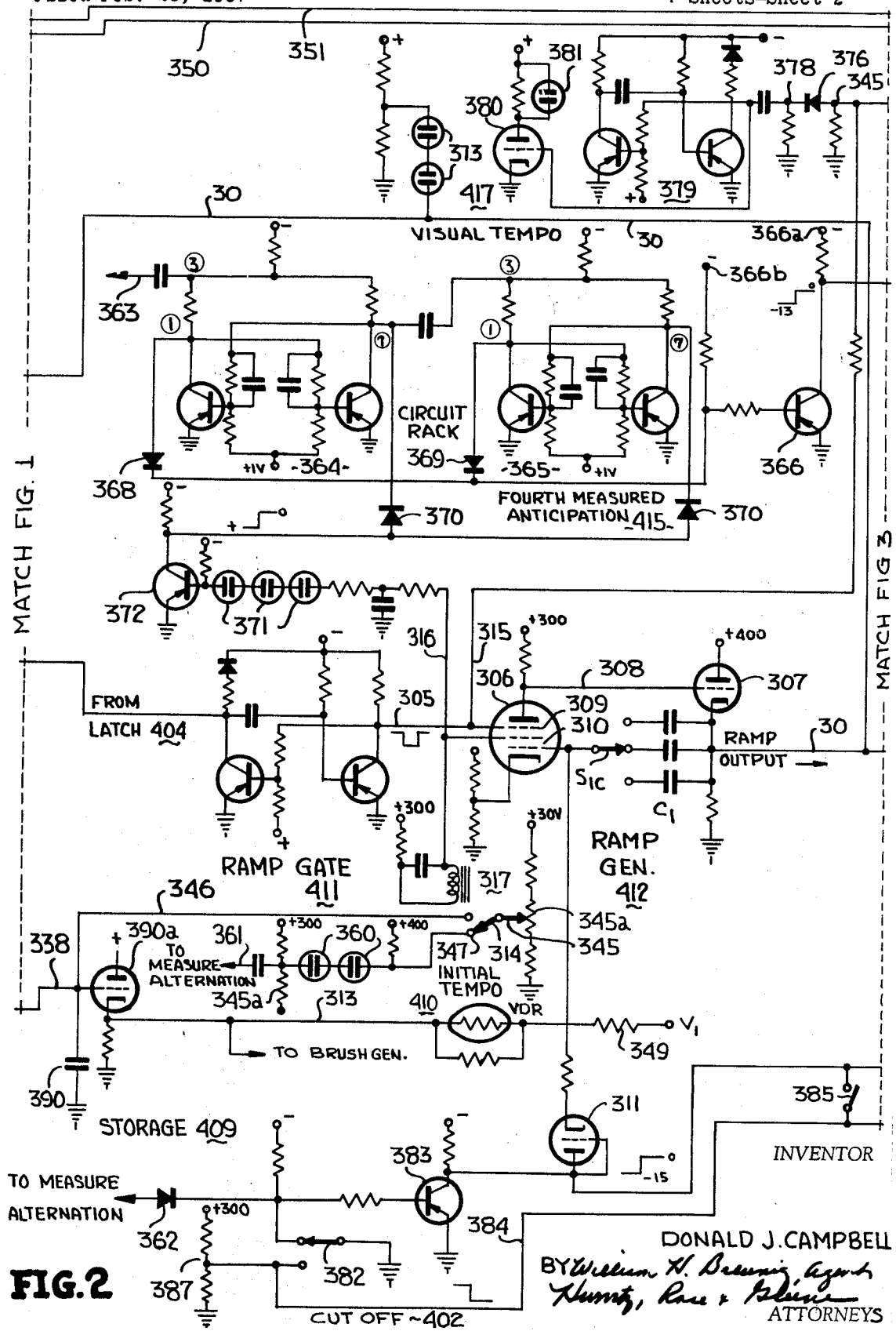
Figure 3:
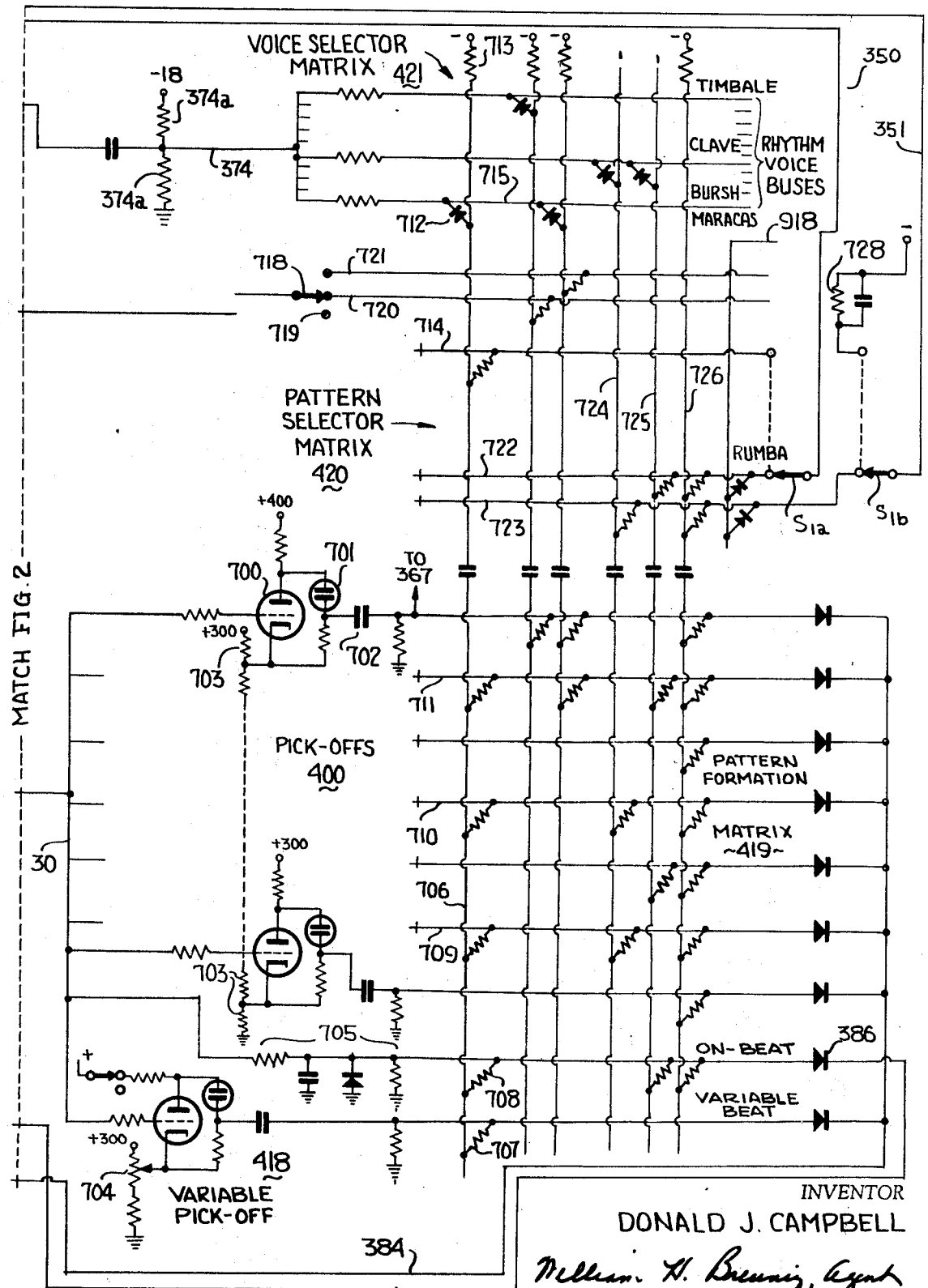
Figure 4:
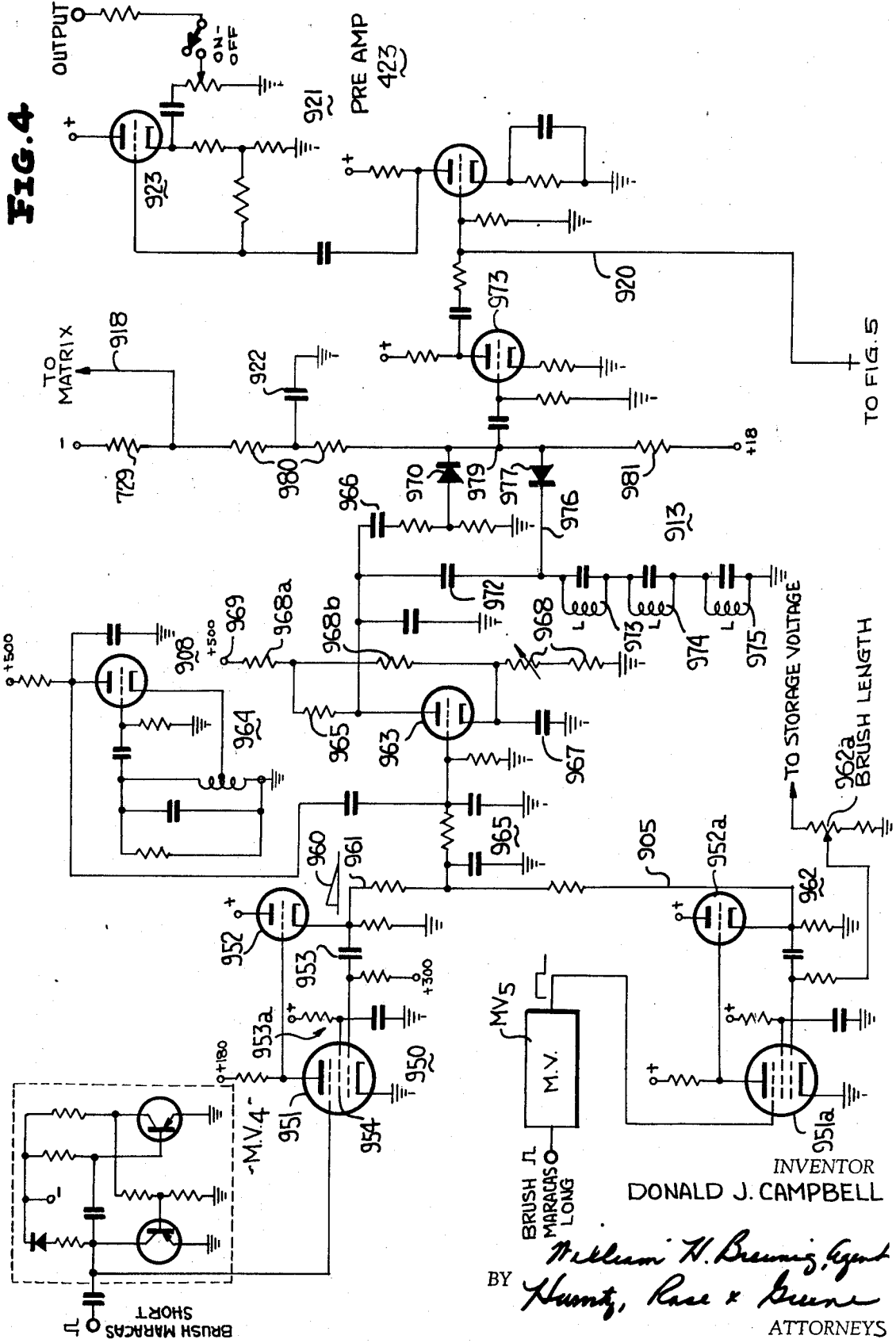
FIG. 4 is a schematic circuit diagram of certain voice generators utilized in conjunction with the circuit diagram of FIGS. 1–3, inclusive.
Figure 5:
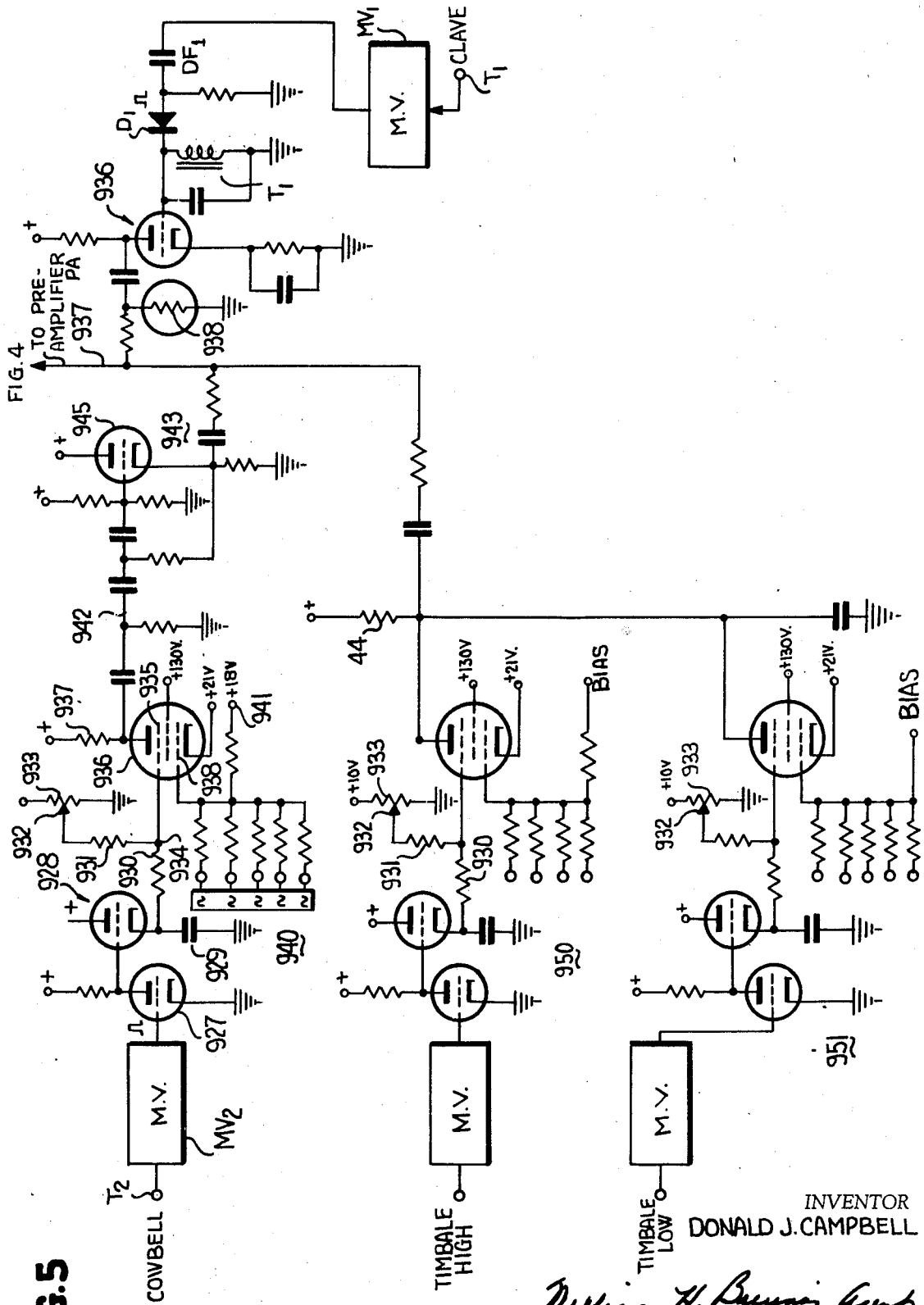
FIG. 5 is a circuit diagram of certain additional voice generators utilized in conjunction with the system of FIGS. 1–3.

Referring now more particularly to the accompanying drawings, more particularly to FIGS. 1–5, where in is disclosed a circuit diagram of the present system and to waveforms illustrated in FIGS. 8–10, reference numeral 10 (FIG. 1) is an input terminal for the present equipment, which is normally connected to the pedal section of an organ so that each time a pedal is operated a tone signal 501 (FIG. 10) appears at the terminal 10. When switch 11 is closed pedal tone is supplied to a conventional transistor amplifier 330 and therefrom to a second stage amplifier 331, also of conventional character, which in turn supplies the tone signal to a detector 334, in the form of an emitter follower transistor having a long time constant RC circuit 334a in its emitter-to-ground circuit. The transistors of the amplifiers 330, 331 and of the detector 334 are of the PNP type and are supplied with negative voltage at their collectors. The time constant of the circuit 334a is sufficiently long that detection occurs and the resultant DC pulse is applied to an amplifier and limiter 15, comprising a PNP type transistor, having a collector load 16, the latter providing at its output a pulse 502, having a flat top due to the limiting action of the limiter 15. The pedal note detector as a whole is identified by the reference numeral 403. Pulse 502 is applied to a latch circuit 404 via lead 18. The latch circuit is essentially a bistable multivibrator which is turned on by the rise of pulse 502 and off at a time thereafter by the signal provided by a latch reset pick-off 404a via lead 425. The operation of the latch reset pick-off 404a will be coordinated into the description of the system hereinafter. The output of the latch 404 proceeds to a ramp gate 411 (FIG. 2) which is a conventional monostable multivibrator, essentially a pulse lengthener, and generates a pulse of sufficient length to drive following circuits. The lead 18 supplying the pulse 502 is also connected to a transfer gate 405, which is a monostable multivibrator generating pulses of sufficient length to drive following circuits and which is conventional per se and accordingly is not further described. Similarly the clock gate 406, FIG. 1, is a monostable multivibrator which generates pulses in response to triggers, of sufficient length to drive following circuits. The transfer gate 405 supplies signal to a PNP transistor 335 operating in the emitter follower configuration and having in its emitter circuit a relay 336. During the time the transfer gate 405 operates, the relay 336 pulls up an arm 337, transferring contact to a line 338 from a line 339. Line 338 transfers voltage provided by a clock 407 into a storage capacitor 390 (FIG. 2). The contact arm 337 returns to line 339.

Referring now to FIG. 10 of the drawings, pedal signal provided at terminal 10 is indicated at 501. The output of the detector 334 is shown as 502. The latch 404 is turned on by the rise of pulse 502, turning off at time 515, to provide a margin time 516 before the next pulse 502 arrives. The relay 336 operates during a time 512 to transfer clock voltage to storage capacitor 390. During the time 512, for which arm 337 is not connected to line 339, capacitor 301, which is normally charged to clock voltage, discharges through resistance 342 to a voltage less than clock voltage. At the end of transfer time 512 relay arm 337 returns to lead 339, and capacitor 301 is rapidly charged back to clock voltage, the recharge being indicated as a pulse 517. The pulse 517 is conveyed through capacitor 340 via line 340a as a positive pulse 509, and actuates the clock gate 406, which is turn generates a pulse 510, recycling the clock 407.

The clock 407 as a phantastron ramp generator which generates a voltage ramp to convert the time between beginnings of actuating of pedal notes into a voltage decreasing as a function of time, to a value representing the time of a measure and which is held in storage and controls the tempo of the device. Clock output is illustrated at 511 of FIG. 10. Voltage 513 is a measure of the tempo in which the organist played the "preceding measure" and is in storage at the first transfer indicated in the waveforms of FIG. 10. Voltage 518 is then a measure of the tempo in which the organist actually plays the current measure, i.e., the measure after the "preceding measure," and this voltage is transferred to storage and will control tempo during the next measure. The fact that 518 is larger than 513 indicates that there has been an increase in tempo. The value of 518 is that value to which the ramp falls during the measure. If the preceding measure and the current measure are of equal durations, 518 would equal 513, and if larger, would be of lower value, because the ramp would have longer to fall.

Clock 407 is a phantastron circuit employed as a ramp generator. One ramp wave is generated for each measure of the music and the times of the percussive notes to be produced by the present system are generated by voltage pick-offs sensitive to selected voltage levels along the ramp, the voltage levels being set to correspond in time to the desired notes. The phantastron ramp generator utilizes a pentode tube 25, the cathode of which is connected to a source of negative potential provided by a voltage divider 26, while the anode is provided with a resistive load 27, connected to a positive voltage source 28. Clock control signal 510, from the clock gate 406 is supplied via lead 29 applied to the second control grid of pentode 25. The screen grid of the pentode 25 is connected to a fixed voltage source, while the first control grid is connected to a timing circuit, composed of resistance 341 and a selected capacitor $C_2$.

The slope of the ramp is controlled by the voltage to which its grid circuit is returned and by the values of capacity and resistance in the grid circuit and therefore timing of the clock generator 407 is determined by the resistance 341 and the selected capacitor $C_2$, connected in the control grid circuit thereof. Diode $D_1$ is connected to a fixed voltage source $V_2$ at its cathode and has its anode connected to the anode of pentode 25. The anode of pentode 25 is connected to the control grid of a cathode follower triode 343. The timing control resistance 341 and the timing control capacitor $C_2$, which may be selected by switch $S_{1d}$, is connected to the cathode of triode 343 to the control grid of pentode 25. If resistor 341 were returned to a fixed voltage, clock output voltage would be a linear function of time. Returning 341 to clock output voltage through the cathode follower 343 results in a nonlinear clock output which is of aid in resolving a clock ramp tracking problem, discussed hereinafter.

The cathode follower 343 drives a further cathode follower 344, the cathode of which is connected to the relay arm 337. Double cathode followers 343, 344 are required in order to prevent premature clock recycling under certain conditions. For example, if storage voltage is low and clock voltage is high because of a large increase in tempo, a short negative pulse, generated when capacitor 390 charges, i.e., when relay 336 pulls up, appears at the cathode of triode 344. This pulse must be isolated from the cathode of triode 343 since if it were not it would be conveyed to the control grid of the phantastron pentode 25, causing it to recycle. The use of a double cathode follower prevents this possibility.

The circuit as described to this point operates to follow the tempo set by the player of an organ as he depresses pedal keys at the initiation of each measure of the music he is playing. However, before he has commenced to play there is no criterion by which the present system can determine tempo. Nevertheless the musician has at least an approximate idea of his tempo and accordingly provision is made for inserting an initial tempo into the system, which determines the timing of the first measure being played. This launching or starting tempo occurs only when starting to play, and is not in effect at any time except for the first measure after the organist starts to play. It is characteristic of phantastrons such as 306 (FIG. 2) of the ramp generator 412 of the present invention that screen current increases greatly when they bottom. During normal playing the ramp never bottoms because another actuating pedal note occurs before the ramp can bottom and recycles the entire device including the ramp generator. But, if the organist stops playing, or if the ramp cycle is aborted for any other reason, the ramp bottoms, screen current greatly increases and relay 317 then operates, pulling up the contact 314 to contact with line 346. When relay arm 314 pulls up, it establishes a connection between slider 345 and line 346 and thence to the storage capacitor 390. The voltage established by slider 345 derived from a potentiometer 345a which may be manually set by the organist before he starts playing, and it is in this way that he establishes an initial tempo. At the beginning of the first measure the screen voltage on phantastron 306 decreases, relay 317 is not energized sufficiently to permit its operation, and arm 314 remains on contact 347.

Accordingly, storage capacitor 390 assumes a charge suitable for playing an initial measure from slider 345. But for succeeding measures the phantastron 306 does not pull up the arm 314, so that the voltage on capacitor 390 is a function of the duration of the previously played measure.

Latch output voltage goes positive at the beginning of a measure (waveform 502). Ramp gate 411 generates a ramp gating wave of sufficient length to recycle ramp generator 412. The phantastron 306 of ramp generator 412 employs a pentode having two control grids 309 and 310 and is a conventional phantastron circuit which produces a ramp wave at anode lead 308. The slope of the ramp is a function of the value of capacitor C1, the resistance in a circuit of the control grid 310 and the voltage to which this resistance is returned. Triode 307 is a cathode follower, the control grid of which is connected to the anode of the phantastron tube 306 and is utilized to obtain a low impedance ramp output as well as to obtain rapid recycling of the phantastron, its cathode load feeding back to control grid 310. Slope range is adjusted by selection of capacitor $C_1$ by means of switch $S_{1c}$ and slope of the ramp wave generated by the phantastron as a function of the tempo of the previously played measure is obtained by returning resistance in the circuit of the first control grid of the pentode 306 to storage voltage at lead 313. A connection to the control grid of pentode 310 occurs from a fixed voltage source $V_1$ via a 15 megohm resistance 349, at the same time the triode 390a transfers voltage from the capacitor 390 to the control grid 310 of the pentode 306 via a voltage sensitive resistor VDR, a non-linear device in which resistance is a function of voltage. Diode 311 has its cathode connected to the control grid 310 of pentode 306, but is normally cut off.

The ramp produced by ramp generator 412 is highly linear, but the relation between the slope of the ramp and the control voltage applied to the ramp generator is not linear. In other words, doubling the slope control voltage, which appears on lead 313, does not produce exactly twice the slope and consequently does not produce a measure exactly half as long. This non-linear control characteristic complicates the relationship between the clock 407 and the ramp generator 412 because a given storage voltage transferred from the clock must have the same time meaning to the ramp generator as it did to the clock. The output voltage time characteristic of the clock must match the control voltage slope characteristic of the ramp generator. Since the ramp is utilized between set voltages, the ramp control voltage slope characteristic is equivalent to a control voltage time characteristic. The two characteristics must match closely so that the clock output voltage resulting from any length measure within the tempo range of the instrument will control the ramp generator to produce a ramp having a slope which will generate a correct measure length equal to the one measured by the clock. This tracking problem is solved by modifying both the clock output time characteristic and the ramp control voltage slope characteristic, so that they are substantially the same. In the clock section the clock characteristic is modified by returning its first grid resistor 341 to its own output voltage. The ramp generator 412 characteristic is modified by returning resistor 349 to fixed voltage $V_1$ and by the use of VDR in the lead 313, which renders the control voltage applied to the control grid 310 non-linear. The ramp voltage now appears on the lead 30.

A series of voltage comparators 400 is connected to the lead 30, each of which is set to produce a pulse at a different voltage level along the ramp. Each voltage comparator or voltage pick-off includes a triode, as 700. The cathodes of the triodes are connected back to pre-selected voltages established by a voltage divider 703. These cathode voltages are selected to make available beats at all positions within the measure that are required by the rhythm patterns to be generated. Assuming that the triode 700 is normally highly conductive the voltage at its anode is low and this voltage is applied across a neon tube 701 connected between anode and cathode of the triode 700. When the ramp voltage reaches a value such that the triode 700 is cut off, current in the anode circuit of the triode becomes zero and the voltage across tube 701 increases to a value such that the neon tube 701 ignites. When that point occurs a transfer voltage through the capacitor 702 occurs, resulting in a pulse. In a preferred embodiment 13 fixed pick-offs are utilized. However, there is no reason why the pick-offs cannot be adjustable, at least to the serviceman, in order to provide a variation of rhythms.

Each pick-off generates a positive pulse when the ramp passes its cathode voltage. These cathode voltages are selected to make available all beats required. The pulses which occur at the outputs of the pick-offs are applied to horizontal lines of the pattern formation matrix 419. Each pick-off is connected to one horizontal line in the matrix, except that no pick-off is needed for the first beat of a measure because at this time the ramp recycles and there is available directly from the ramp a large voltage step which is shaped by network 705 into a pulse similar to those generated by the pick-offs. In addition, there is provided a variable pick-off 418 which has an adjustable cathode voltage provided by potentiometer 704. 704 may be set by the organist to provide a beat at any time within the measure in addition to the beats of the pattern, thus making possible an artistic choice of a large number of variations on the fixed rhythm patterns.

Each vertical bus in the matrices represents a musical part to be played by one or more rhythm voices in one or more rhythm patterns. The pattern formation matrix 419 determines which of the available beats will be selected for a particular part and this is accomplished by resistors connecting the vertical buses with the appropriate horizontal pick-off buses. In general, any horizontal pick-off buss will be connected to plural ones of the vertical buses. The pattern selector matrix 420 determines which of the vertical buses will be used to make up a particular rhythm pattern. This is accomplished by resistors connecting the selected vertical buses with the appropriate horizontal switch buses of the pattern selector matrix. Switch S1 selects appropriate vertical buses to make up the complete rhythm pattern by placing at ground potential one or more horizontal buses of the pattern selector matrix which have resistors connected to the desired vertical buses. The voice selector matrix 421 determines which rhythm voice or rhythm voices will play the musical part represented by a given vertical bus and this is accomplished by diodes connecting the vertical buses with the appropriate horizontal rhythm voice buses of the voice selector matrix.

For example, vertical bus 706 represents a musical part composed of the variable beat through resistor 707, the on-beat (first beat of the measure) through resistor 708, and three additional beats generated by pick-offs connected to buses 709, 710 and 711. Diode 712 is normally not conducting because its anode is connected to a negative voltage source through resistor 713. When the rhythm part represented by bus 706 is needed, horizontal bus 714 in the pattern selector matrix is grounded by $S_1$. Diode 712 now conducts the positive pulse on bus 706 to bus 715 and the rhythm part represented by bus 706 is played on the brush.

Diodes in the pattern formation matrix connected to 384 and 716 relates to cut-off 402 and are normally non-conductive. Switch S1 is the rhythm pattern switch and sets up a given pattern by controlling the voltages on the various horizontal buses of the pattern selector matrix 420. $S_1$ is positioned to a desired rhythm pattern by the organist before beginning to play and accordingly has one position for each rhythm pattern available, e.g., waltz, rhumba, for trot, etc. In addition to setting up rhythm patterns in the matrix, $S_1$ also must set an appropriate tempo range for each rhythm pattern by selecting values of the timing capacitor $C_1$ in the ramp generator and the timing capacitor $C_2$ in the clock. $S_1$ must also select and appropriate operating point for the latch reset pick-off, to match the tempo range. As illustrated, $S_1$ has five poles. Of these $S_1a$ and $S_1b$ are utilized to control the matrix, $S_1C$, $S_1d$, and $S_1e$ are utilized to control the ramp generator, clock, and latch reset pick-off respectively.

The tempo range of the device of the present invention is limited by the amount of ramp slope change available in response to ramp slope control voltage. This range of values is not sufficient for all the tempos likely to be encountered in organ playing, but advantage can be taken of the fact that rhythm patterns having a large number of beats per measure cannot be played at a high number of measures per minute, and conversely, that patterns having only a few beats per measure are not likely to be played at a very low number of measures per minute. To make use of the available tempo range, three ranges are provided, designated by time signatures 2/4, 3/4 and 4/4, and an appropriate one is selected by switch $S_1$ for each pattern. The 2/4 range runs twice as fast as the 4/4 range and this is reflected in values of $C_1$ and $C_2$. The 3/4 range is intermediate in tempo and is used only for patterns such as the waltz which have a basic time division of three within the measure. In order to minimize the total number of pick-offs required, the 3/4 range utilizes only the first 3/4 of the ramp waveform. FIG. 8 indicates that this method allows using the same pick-off for 3/4 time as for 4/4 time. As indicated in FIG. 8, the total ramp length is divided into four sectors, for which a total of thirteen fixed pick-offs is utilized, and one variable pick-off is provided. The total range of pick-offs may then be used for 4/4 time, three-quarters of the pick-offs for a 3/4 time. To set the 3/4 pattern, switch $S_1$ sets the latch reset pick-off to operate when the ramp has run a little less than three-quarters of the way down. The organist playing in 3/4 time will strike a pedal note at the three-quarter point of the ramp, causing the device to recycle, and the last quarter of the ramp is never reached except when the organist stops playing. The fact that the last quarter of the ramp is reached when the organist stops playing has no effect other than to delay the initial tempo a little, because the vertical matrix lines used for 3/4 patterns have no connections to pick-off beyond the 3/4 ramp point. When a 2/4 time is desired, on the other hand, the $C_1$ values are set twice as slow as for the 4/4 range, and accordingly the entire ramp is utilized.

FOURTH MEASURE ANTICIPATION

The fourth measure anticipation facility operates to insert additional beats near the end of each fourth measure. Popular music frequently is made up of four measure segments and drummers sometimes insert an extra beat or a small flourish at the end of each four-measure segment, which anticipates or leads up to the next four-measure segment. Flip-flops 364 and 365 are connected in cascade, as a counter, to provide a total count of four. The initial one of the multivibrators, i.e., 364, is driven from lead 363, connected to the first pick-off before the half-way point of the ramp, since all anticipatory beats will occur in the last half of the fourth measure. Diodes 368 and 369 are connected between the collectors of the two flip-flop stages constituting the counter to the base electrode of the transistor 366, and forming an AND gate which causes transistor 366 to conduct only when both 368 and 369 are cut off. The base of transistor 366 is normally maintained negative from a terminal 366b and transistor 366 is of the PNP type, which is held from conductivity whenever either of the diodes 368 or 369 is conductive since in such case the base of the transistor 366 is held positive by the first collector of one or the other or both of the first stages of the flip-flops 364, 365. Accordingly, the transistor 366 is cut off for a length of time equal to one measure, beginning just before the half-way point of each fourth measure, as is indicated in FIG. 9. That figure shows ramp voltages corresponding with musical measures, and a set of four measures is shown as one segment. The pulses occurring at 363, and deriving from the first pick-off before the half-way point of the ramp are shown at line $b$ of FIG. 9. The operation of the flip-flops 364, 365 in response to these pulses is shown at $c$ and $d$ of FIG. 9 (pulses at line $d$ being twice as long as those of $c$ because of the divide-by-2 character of the pair of flip-flops). The operation of the gates then converts the pulses at lines $c$ and $d$ of FIG. 9 to a single pulse $e$, which terminates at the fourth one of the pulses of FIG. 9b, i.e., at a count of 4. Thus, the count of four is completed halfway through the fourth measure, since the count of four begins halfway through the first measure of the four-measure segment.

The collector of the transistor 366, which is normally negative, goes to zero when it is gated on and this occurs beginning in the last half of the fourth measure of a four-measure segment and continues through the first half of the first measure of the next four-measure segment. The output pulse derived from the transistor 366 proceeds to the switch 718 which has three positions, an off position designated 719, and two operating positions controlling horizontal buses 720 and 721 in the pattern selector matrix. Buses 720 and 721 operate in the same manner as the other horizontal buses in the pattern selector matrix but they are controlled by switch 718 rather than $S_1$. When switch 718 is placed in the 720 position the last beat available in the measure is played by the timbale as an anticipatory beat at the end of each fourth measure. When switch 718 is placed in the 721 position the last two beats available in the measure are played by the brush as an anticipatory flourish at the end of each fourth measure. In the event the musician does not desire to add any fourth measure anticipation effects to the pattern he places switch 718 in the 719 position.

The problem now exists that the two flip-flops 364 and 365 should be in their zero state in order that they may start the count of four measures at the beginning of play by an organist. This is assured by the reset diodes 370. Before the organist begins to play, the system of the present invention is always in its initial tempo position, ramp voltages have bottomed out, screen current of the phantastron ramp generator 306 has increased and screen voltage is at its lowermost point and in fact is lower than when the ramp generator is running. Voltage on the screen of the ramp generator, i.e., the pentode 306, is sufficiently low that the neon lamps 371 are extinguished. The PNP transistor 372, which has its base connected to a negative source of potential accordingly conducts. Conduction is terminated when neon lamps 371 are fired, conveying positive voltage to the base of the transistor 372. The collector of the transistor 372, which is connected through a resistive load to a negative source of potential is also connected to the anodes of the reset diodes 370. So long as transistor 372 is conductive its collector is near ground voltage, and accordingly, negative potential derived from the PNP transistors of the flip-flop 364, 365 can pass through the diodes 370, and thus the flip-flops are maintained in the initial tempo condition, the diodes 370 being connected to the appropriate sides of the flip-flops. At the beginning of play initial tempo goes off, whereupon screen voltage of pentode 306 commences to rise until neon tubes 371 conduct. When these conduct, transistor 372 becomes non-conductive, being cut-off by the positive voltage on lead 316 passing through the neon cells 371. When transistor 372 becomes non-conductive the potential on the anodes of the diode 370 rises sufficiently to cut these off, thereby releasing the flip-flops 364, 365 for counting purposes. Voltages are so established that diode 370 will remain cut off during play, i.e., the ramp voltage never attains such values that the ramp voltage pentode 306 can fail to maintain the neon tubes 371 conductive.

MEASURE ALTERNATION

Some rhythm patterns extend over two measures, in the sense that the musical part played by one rhythm voice may be the same for all measures, while for another voice of that pattern, the pattern may have one form for first measures of each pair of measures and another form for the second measures of the pair. For example, in a typical rumba pattern the musical part played by the maracas is the same for all measures but the part played by the clave is two measures long, having an "A" measure and a "B" measure which occur in alternation and which are different. It is the function of the measure alternation facility to produce the required alternate patterns.

For example, in one typical rumba pattern, illustrated in FIG. 7 of the drawings, the maracas rhythm is the same for all measures, but the clave part is composed of two distinct rhythms played alternately, each for one full measure.

It is a function of the present system to provide alternation of rhythms in successive measures, automatically. 416 is a conventional bistable multivibrator driven through lead 367 by the last pick-off (700) so that it changes state near the end of each measure and produces output waves 603 and 604. These output waves are conveyed to $S_1a$ and $S_1b$ by leads 351 and 350 so that $S_1a$ controls the pattern selector matrix by wave 604 and $S_1b$ controls this matrix by wave 603. An open circuit or a negative voltage applied to a horizontal bus of this matrix has no effect on the associated diodes of the voice selector matrix and they remain non-conducting. These diodes will become conductive if $S_1$ applies a ground connection to the associated horizontal buses. The most positive value of waves 603 and 604 is ground potential and is equivalent to a ground connection. This arrangement results in vertical buses controlled by $S_1a$ being turned on only during the "A" measure and vertical buses controlled by $S_1b$ being turned on only during the "B" measure.

For example, vertical bus 726 collects the pulses for the maracas part of the rumba pattern of FIG. 7 and this bus is controlled by both $S_1a$ and $S_1b$ resulting in this maracas part occurring in both the "A" and "B" measures. However, the clave part in FIG. 7 is different in the "A" and "B" measures; vertical bus 725 collects the appropriate pulses for the "A" measure, vertical bus 724 collects the appropriate pulses for the "B" measure and these two buses are controlled by the appropriate one of the two $S_1$ poles to produce the clave part of the FIG. 7 rumba pattern. In other words when $S_1$ is set to the rumba position, 726 is always grounded; 725 is grounded only during the "A" measure and 724 is grounded only during the "B" measure.

In the event a rhythm pattern is only one measure long it is convenient to use $S_1a$ to control such pattern's vertical bus or buses and to use $S_1b$ to prevent multivibrator 416 from changing states regardless of pulses at 367 by applying a negative voltage to lead 350 through resistor 728. For example, the pattern represented by vertical bus 706 is of one measure duration, is controlled by $S_1a$ through horizontal bus 714 and multivibrator 416 is held continuously in the "A" measure state by negative voltage applied to 351 through resistor 728 by $S_1b$. Each one measure pattern has only one horizontal bus and this bus is controlled by $S_1a$; $S_1b$ is connected to resistor 728. Each two measure pattern has two horizontal buses; one controlled by $S_1a$ for the "A" measure and the other controlled by $S_1b$ for the "B" measure.

When the organist begins to play, the flip-flop 416 must always be in the A state. When the organist stops playing, the flip-flop may be in either state. To this end leads 361 and 362 are provided.

Turning to the initial tempo circuit, relay arm 314, in its down position, proceeds to neon-bulbs 360. But 314 is connected to an initial tempo control potentiometer 345a, the output of which is never high enough to fire bulbs 360. When the organist stops playing, 314 pulls up whereupon the bias of the bulbs 360 is released from potentiometer 345a, and bulbs 360 conduct, producing a sharp positive pulse at lead 361, which in turn sets flip-flop 416 to the "A" state, if not already there.

CLAVE (FIG. 5)

The clave sound simulates two hard wooden rods struck together. Output rhythmic pulses from the voice matrix are applied to terminal T1, lengthened in monostable mulitvibrator MV1, and then lengthened pulses coupled out to a differentiating circuit DF1. The positive going pulse generated by DF1 is passed by diode D1 to a high Q tank circuit T1, which produces a decaying sinusoid. The latter is amplified in triode amplifier 936, and the output of 936 is passed to preamplifier PA via lead 937 after being subjected to the action of a non-linear resistance 938. The resistance 938 has a characteristic such that its resistance decreases instantaneously as the voltage across it increases. Since it is connected in shunt to lead 937, it acts to decrease the higher peaks of the sinusoid in line 937 more than it does the lower peaks. The diode D1 acts to isolate the tank circuit T1 from the preceding pulse source, which might otherwise damp the tank circuit T1. Thereby D1 acts to increase the length of the sinusoid. Voltage sensitive resistance 938 has an equivalent effect in that the low amplitude end of the sinusoid can be amplified to the audible level in a high gain amplifier, without overloading the latter at the high amplitude end. The net result is a long slowly decaying sinusoid, as heard by the listener.

COWBELL

When an appropriate sequence of rhythmic pulses is applied to the cowbell terminal T2, these are lengthened by monostable multivibrator MV2, connected to supply positive pulses. The latter are amplified by amplifier 927, which in turn drives a cathode follower circuit 928, having a capacitor 929 in its cathode circuit. Capacitor 929 changes rapidly in response to each positive pulse applied to cathode follower 928 by amplifier 927, but discharge of the capacitor 929 occurs slowly through high resistance 930 (22 M) and through resistance 931, terminated on a potentiometer slider 932. The position of the latter along its resistance 933 establishes a termination voltage for discharge of capacitor 929.

Voltage at the junction 934 of resistances 930 and 931 drives the second control grid 935 of a pentode 936, which is anode loaded by resistance 937, and which has, connected to its first control grid 938, a plurality of sources of sinusoidal voltage 940, the frequencies and amplitudes of which are selected to simulate the partials of a cowbell.

Pentode 936 is biased, from source 941, so that no signal passes except while sawtooth voltage appears at second control grid 935. The anode of pentode 936 is coupled to a conventional high pass filter 942, in cascade with a conventional active high pass filter 943, and the output of the latter, taken from the cathode of its active element, triode 945 and applied to lead 937 and thence to preamplifier PA. The high pass filter is required to eliminate low frequency thump.

High and low timbale circuits 950 and 951 are provided. These circuits are much like the cowbell circuits except that different arrays of generators may be used, than for the cowbell, and the filters 942, 943 are dispensed with, since thump is now desired, and in that the bias circuits for pentode 936 may be different.

BRUSH-MARACAS (FIG. 4)

The present system provides two brush-maracas voice generators, one long and one short. In each case there is employed a monostable multivibrator $MV_4$ and $MV_5$ as a pulse lengthener, as in the other voices, because the rhythmic pulses are quite short. The output pulses from the multivibrator $MV_4$ are applied to a phantastron sawtooth generator 950, in the case of the short maracas. The latter includes a pentode 951, to the second control grid of which the control pulses are applied. The pentode 951 is anode loaded, and the anode is connected to the grid of a cathode follower triode 952, the cathode of which is coupled back to the first control grid of the pentode 951 through capacitor 953. An RC bias circuit 953a is provided for the screen grid 954. In such case, a sawtooth gating wave 960 is present on cathode lead 961.

In the case of the short brush-maracas no control of sawtooth slope is provided. In the case of a corresponding circuit for generating long brush-maracas sounds, a novel bias control circuit 962 is provided for the first control grid of pentode 951a, which serves to control the slope of the generated sawtooth, and therefore its length. The input to the bias control is not a fixed voltage, but derives from tempo storage control source. Accordingly, not only can pulse length be controlled manually, by adjustment of potentiometer 962a, but if tempo increases, the brush maracas strokes become automatically shorter. Thereby the sounds are prevented from becoming blurred or indistinct due to the occurrence of overlapping strokes, and this without requiring manual manipulation.

The sawtooth wave 960 is applied to the grid of gating triode 963 through low pass filter 965 which imparts a more desirable wave shape to the sawtooth wave. 964 is a super-regenerative noise generator of known type which provides noise signal to be gated by 963. Voltage divider 968a, 968b and 968 provide suitable operating voltages for gating stage 963, 968 being adjustable so as to insure being able to operate triode 963 normally non-conducting. Cathode bypass capacitor 967 is large enough to pass the desired higher frequency portion of the noise signal but is small enough to attenuate the undesired low frequency portion of the sawtooth gating wave. Gated noise output across anode load resistor 965 can be conveyed to point 979 by one of two routes; through capacitor 966 and diode 970, or through capacitor 972 to filter 913 and through diode 977. Filter 913 has three tuned LC circuits, 973, 974, and 975 each tuned to a slightly different frequency and imparts a maracas quality to the signal at point 976. When the DC level of point 979 is made positive with respect to ground, diode 970 is nonconductive and diode 977 conducts maracas signal to amplifier stage 973. When the DC level of point 979 is made negative with respect to ground, diode 977 is non-conductive and diode 970 conducts brush signal through 966 to amplifier stage 973. The DC level of point 979, and accordingly the choice of brush or maracas sound, is controlled by the presence or absence of diodes connected to bus 918, a special DC vertical bus existing only in the pattern selector matrix. If a given pattern requires maracas sound, a diode is connected between bus 918 and the horizontal bus or buses for that pattern. If brush sound is required no diode is used.

The operation of the diodes connected to bus 918 is as follows. If no diode is connected to bus 918 for a given pattern the DC level at point 979 is negative and brush sound is produced because the total resistance connecting point 979 to the negative source, i.e. resistors 729 and 980, is less than the value of resistor 981 which connects point 979 to a positive source. When a diode is connected to bus 918 this bus is grounded in effect, point 979 assumes a positive DC level because its only source of potential is the positive source through resistor 981, and maracas sound is produced.

For example, when $S_1$ is placed in the rumba position, bus 918 is grounded through diodes connected between bus 918 and horizontal buses 722 and 723. Point 979 is maintained positive through resistor 981 and maracas sound is produced. On the other hand when $S_1$ is placed in the uppermost position and is controlling horizontal bus 714, there is no diode connecting bus 714 to bus 918, point 979 will be maintained negative and brush sound will be produced.

VISUAL TEMPO INDICATION

The visual tempo indicator provides a visual indication of the beats of the pattern being generated. It is desirable to provide one indicator for the first beat of each measure and another indicator to visualize all the remaining beats of that measure. Neon bulbs 373 are utilized to indicate the first beat of each measure. To this end the neon bulbs are connected at one terminal to a positive voltage source and at the other terminal through line 30 to the ramp output voltage. The bias is set so that the neon bulbs ignite only at the tips of the ramp waves, and these tips occur only at the beginning of each measure. Indication of all other beats of the pattern are given by neon bulb 381 which flashes in response to pulse at point 374. 374 is the biasing point at which negative bias voltage from voltage divider 374a is provided for all the rhythm voice buses of the voice selector matrix. Accordingly, a pulse must arrive on at least one of these lines for each beat of the pattern, i.e., whenever a voice is sounded These pulses are passed to the point 345 and added to the ramp gating pulse 504 existing on line 315. The pulse 504 cuts off diode 376 during the first beat of the measure but all other pulses are passed by diode 376 to point 378. This operation then eliminates the first beat of the measure but passes all the remaining beats, the first beat being indicated by the neon bulbs 373.

Pulses at 378 trigger a monostable multivibrator 379 which acts as a pulse lengthener to make the pulses long enough to be perceived by the eye when they actuate a visual indicator. The output of multivibrator 379 causes neon bulb 381 to conduct by reducing the impedance of tube 380.

CUT-OFF

It is essential to provide the organist with a means for stopping the device of the present invention at any time. Most popular music ends on an accented pedal note. A measure of rhythmic accompaniment following this note is not desired. Nevertheless, it will be produced by the device of the invention if the organist is not provided with some means of stopping or terminating operation of the automatic rhythmic accompaniment system immediately after this final pedal note. Were this all that is desired it might merely be necessary to provide a switch for cutting off the audio signal, so that while the rhythmic interpolator continues to operate no rhythmic sounds would be heard. It is necessary, in addition to cutting off the sound, to provide a facility for making rapid tempo changes, for providing breaks in the rhythm, which are useful in avoiding monotony. Slow changes in tempo are provided for in the automatic following operation of the system, but there are occasions when the organist desires to make a sudden large change of tempo. Breaks occur when the organist either desires to stop playing completely, for a short time, or desires to play the organ without any rhythmic accompaniment for a short period of time. An example of this is the omission of rhythmic accompaniment during the pickup of a popular song, i.e. the introductory notes of the melody leading up to the first accented note of the melody. Omission of rhythm accompaniment during pickup at the beginning of playing is provided for by the system because no pedal note is played until the accented melody note. But if the melody repeats, it may be desirable to again omit rhythmic accompaniment during the pickup.

The above objectives may be achieved if the cutoff section of the system aborts the measure presently being played, at the instant a cutoff device is actuated and thereupon instantly places the device in the initial tempo condition. This arrangement provides for rapid tempo changes by allowing the organist while playing to set the new tempo on the initial tempo control 345 at any time he has a free hand. This will have no effect while the organist is playing because the initial tempo circuitry is not then effective. At the instant before the first pedal note of a new tempo, the organist need only momentarily actuate the cutoff device whereupon the system is instantly placed in initial condition and the next pedal note initiates rhythm accompaniment in the new tempo. The same procedure provides for rhythmic breaks, since in this case the initial self-tempo setting may be the same as a tempo being played and cutoff may be actuated for a period of time either while playing, in order to omit rhythmic accompaniment, or during pause in playing.

As a second mode of operation to produce cutoff, in addition to the present measure being aborted and an initial tempo being instantly turned on, as in the first described mode, each pedal note played while cutoff is actuated produces the same rhythm sound as does the first beat of the pattern. In this way the automatic cut-off device is converted into a pedal stop having an appropriate rhythm accompaniment voice. This mode of operation is useful in breaks and is especially useful at endings of songs. Near the end of most popular music the rhythmic accompaniment changes from a regular pattern to an ending pattern which may consist entirely of accented notes and these notes would normally be played by means of the organ pedals. Thus the organist actuates the cut-off device just before the first pedal note of the ending section of the music being played, and normal pedal playing produces a desired rhythmic accompaniment for the end of the piece.

Cut-off operation occurs by virtue of the circuitry at 402. A pedal switch is provided 382, which can be operated by lateral pressure of the organist's right foot on the expression pedal. During normal play switch 382 is in its upper position which serves to apply low potential to the base of the PNP transistor 383 turning the latter off. Diode 311 has its cathode connected to the first control grid of the ramp generator pentode 306. The anode of diode 311 is connected to the collector of transistor 383 so that while transistor 383 is cut off, high negative potential is applied to the anode of diode 311 and it is cut off. Accordingly, the ramp generator is unaffected by the circuit involving the diode 311. When the switch 382 is moved into its lowermost position the potential on the base of transistor 383 goes highly negative and it being a PNP transistor having a grounded emitter and a highly negative collector, transistor 383 becomes highly conductive. At this time diode 311 also becomes conductive because its anode goes substantially to ground potential, providing the first control grid 310 of the ramp generator pentode 306 with a low impedance path to ground, which rapidly discharges the selected $C_1$ capacitor and causing the ramp to fall to its bottom very rapidly. This action aborts the measure then being played and turns on the initial tempo because the ramp is bottomed and in this condition screen current is high. The reason for using a thermionic diode at 311 is that the resistance of the grid circuit 310 of the ramp generator pentode 306 is high and a solid state diode would have undue leakage. The rapid rundown of the ramp would cause all of the remaining beats of the measure to sound almost simultaneously at the moment cut-off is actuated. To avoid this contingency, diodes connected to 384 in the pattern formation maxtrix, normally cut off by positive bias divider 387, are grounded through the switch 382 when in its lower position, and therefore conduct during the time cut-off is actuated, effectively shorting out all pulses of the rhythmic pattern except possibly the first beat pulse, which is controlled by diode 386. 386 is connected to cut-off voltage switch 385 and when this switch is closed, 386 shorts out the first beat pulse and the first mode of operation described above is obtained. If the second mode of cut-off operation is desired switch 385 is opened, whereupon diode 386 has no effect on the first beat pulse and whatever voices are connected to the first beat pulse, will sound each time the pedal is played during the time cut-off switch 382 is actuated because the ramp will cycle rapidly in response to each pedal note.

The diode 362, which is connected to the base of the transistor 363 clamps the measure alternation circuit 416 in its proper starting state as long as switch 382 is actuated.

Reviewing now the operation of the present system, and recalling that the present system is an improvement of the system disclosed in U.S. Pat. No. 3,140,336 to Campbell, the present system differs from the Campbell patent in the following respects. In the Campbell patent use is made of an oscillator and counter to generate a rhythmic pattern. In the present application use is made of a ramp and pick-off, which permits generation of extremely complex patterns, whereas use of the counter permits only generation of relatively simple patterns. The present application provides systems for generating rhythmic voices of characters which are not provided in the Campbell patent. The present application includes provision of visual tempo indication and also of a cut-off system which allows the organist to pre-empt control of the rhythmic interpolator under certain circumstances, particularly to achieve interruptions of rhythmic interpolation and at the ending of a musical selection.

Referring particularly to FIG. 6 of the drawings, latch 404 opens in response to initiation of a pedal note, which is detected by the pedal note detector 403. This actuates a transfer 405 which places a variable clock voltage, as it exists at that instant, in storage capacitor 409, for use to control tempo during the presently being played measure. The clock 407 is reset when transfer is complete to allow the clock to begin measuring the length of the present measure, which in turn will be transferred to storage capacitor 409 at the beginning of the next measure. The pedal note detector 403 converts the pedal signal into a long pulse. The latch 404 is a bistable multivibrator which is turned on by the rise of pulse 502 and off by the latch reset circuit 425. The ramp gate 411 and the transfer gate 405 and the clock gate 406 are all active pulse lengthening circuits in the form of monostable multivibrators, which generate pulses of sufficient length to drive the circuits following them in response to relatively short pulses.

The transfer 408 momentarily transfers voltage from clock 407 to a storage capacitor 409 at the end of each played measure and more specifically at the time that the pulse 502 rises. The pulse 502 was initiated by the beginning of a pedal note and terminated just before the initiation of the next measure. The phantastron clock 407 generates a voltage ramp which is used to convert the time of a meaure, i.e., the time between beginnings of actuating pedal notes, into a voltage, which is held in storage in the storage capacitor 409, and which control the tempo of the succeedfng measure. The stored voltage is then a measure of the tempo that the organist actually played for the preceding measure and will control tempo during the present measure. This part of the system essentially duplicates the system of Campbell 3,140,336.

The storage capacitor 409 controls the slope of the output of the ramp generator 412, which is a phantastron circuit much like the circuit of the phantastron clock 407. The ramp generator commences its operation when latch 404 is opened and provides a ramp voltage which extends between two fixed voltage levels, in a time determined by the charge stored in the storage capacitor, the latter in turn depending upon the total rundown of the ramp produced by the phantastron clock in the preceding measure of play. A series of pick-offs is provided at preselected points along the ramp output of the ramp generator 412, by the circuits included in the pick-offs 400 and these are fed to a pattern formation matrix 419. The latter is in the form of a matrix having horizontal lines each corresponding with one of the pick-offs, and with vertical lines which are selectively connected to the horizontal lines, the selections being such that series of pulses in diverse rhythm patterns appear on the vertical lines. Switch $S_1$ are provided for gating any selected one of the vertical lines through a voice selector matrix 421 to a selected one of a plurality of rhythm voice generators 422 and from the later the percussive voices, sounding in rhythmic patterns, are applied to preamplifier 423 and thence proceed to the acoustic output of the organ.

Since some frequently encountered rhythm patterns extend over two measures, a measure alternation facility 416 is provided which itself selects rhythms in the rhythm selector matrix 420 which are different in alternate measures. For example, in a typical pattern, the musical part played by the maracas is the same for all measures, but the part played by the clave is two measures long, having an A measure and a B measure which alternate throughout the playing. Measure alternation produces this type of rhythm pattern by providing means to switch patterns or parts of patterns in the matrix during alternate measures.

$S_1$ is the rhythm pattern switch operated by the organist and has one position for each rhythm pattern available, e.g., waltz, rhumba, fox trot, etc. In addition to setting up the patterns of the matrix $S_1$ must also set an appropriate tempo range for each pattern by selecting alternative timing capacitors in the ramp generator 412 and alternative timing capacitors in the ramp generator of the phantastron clock 407. Furthermore, a pole of switch $S_1$ is utilized to select an appropriate operating point for the latch reset pick-off which proceeds back via lead 425 to reset the latch 404.

The fourth measure anticipation facility 415 operates to insert additional beats near the end of each fourth measure. Popular music frequently is made up of four measure segments and drummers sometimes insert an extra beat or a small flourish at the end of each four-measure segment which anticipates or leads up to the next segment. The fourth measure anticipation facility involves two flip-flops to provide a count of four. Fourth measure anticipation facility 415 operates from the pick-offs 400, counting pulses of the latter until the fourth measure has been achieved, and thereafter inserting a signal into the pattern selector matrix 420 to provide the additional beats. Circuitry is provided to assure that the fourth measure anticipation circuit is always in the correct state to start the count of four at the beginning of play.

Visual tempo devices are provided, one of which, 417, indicates the first beat of each measure and the other of which, 418, visually indicates all the remaining beats which are played. The visual tempo indicator 418 derives its output from the rhythm voice selector matrix 421.

It is essential to provide the organist with a means for stopping the device at any time he wishes. Most popular music ends on an accented pedal note and a measure of rhythm accompaniment following this note is not desired, but will be produced by the device if the organist is not provided with some means for stopping the rhythmic accompaniment system immediately after this final pedal note. Additionally, rhythmic breaks are sometimes used when the organist wishes to suddenly make a large change or tempo or when the organist either stops playing or desires to play without heavy rhythmic accompaniment for a time period. A frequent example of the latter is the omission of rhythmic accompaniment during the pickup of a popular song, i.e., the introductory notes of the melody leading up to the first accented note on the melody.

The cut-off circuit 402 is controlled by a switch 401 located on the expression pedal and when it is operated it terminates operation of the pattern formation matrix via line 426, returns the measure alteration circuit 416 in its starting position by means of the line 427 and holds the ramp generator 412 in its run down condition ready for initiation of a new rhythm or for reoccurrence of the original tempo at the instant that the player desires. Thereby the present measure is aborted. The cut-off system enables the player to set a new tempo into the system while playing, then to operate the cut-off switch 401 momentarily, whereupon the system takes off on the new tempo established by the initial tempo device 410. If a pedal note is played while cut-off is actuated, the system produces the same rhythmic sound as does the first beat of the pattern; in other words the automatic device of the system is converted into a pedal stop having an appropriate rhythm accompaniment voice, but without automatic rhythm. This permits the organist, near the end of a popular selection, to change the rhythm accompaniment from the regular pattern to an ending pattern which may consist entirely of accented notes, these notes being played on the organ pedals. The organist actuates the cut-off just before the first pedal note of the ending section of the music being played and his normal pedal playing then produces a rhythm accompaniment ending.

Rhythm voice generators available in the present system are long brush, short brush, long maracas, short maracas, cowbell, high timble, low timble and clave.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. In a system for controlling the rhythmic accompaniment pattern provided by a background instrument of the repetitive rhythm type,
   a source of repetitive ramp wave forms, each wave form having the duration of a measure of a musical composition,
   adjustable means for controlling the repetition rate of said repetitive ramp wave forms,
   means for deriving a sequence of pulses in response to preselected voltage levels along said repetitive ramp wave forms,
   matrix means for at will selecting various distinct arrays of said pulses corresponding with rhythmic patterns and applying the selected pulses to selected conductors of said matrix, and
   means responsive to said selected pulses for generating rhythmic sounds of diverse characters.

2. The combination according to claim 1 wherein is provided means maintaining the maxima while minima of said ramp wave forms at fixed levels and conforming the slopes of said ramp waves to provide said repetition rate.

3. The combination according to claim 2 wherein is provided
   a player controlled instrument, and
   means for correlating the tempo of said player controlled instrument with the slopes of said ramp wave forms.

4. A rhythmic accomplishment system for generating a predetermined pattern of pulses having a controllable overall duration of said pattern, comprising
   a source of a ramp wave form of duration equalizable to the duration of a measure of music,
   means clamping the maximum and minimum values of said ramp wave form,
   means for adjustably varying the slope of said ramp wave form to vary the duration of said ramp wave form to conform with said durations,
   means for sampling said ramp wave form at a predetermined sequence of levels therealong to generate said predetermined pattern of pulses,
   means for preselecting an array of pulses from said sequence of pulses, and
   means responsive to each of said array of pulses for generating a musical tone.

5. The system according to claim 4 wherein is provided a matrix comprising first leads and second leads, arranged orthogonally of said first leads,
   wherein said means for sampling includes plural pickoffs each adjusted to pick off one level along said ramp wave form,
   means connecting each of said pickoffs to a different one of said first leads, and
   means connecting selected ones of said first leads to selected ones of said second leads,
   whereby each of said second leads carries a sequence of pulses selected from among those provided by said plural pickoffs.

6. The combination according to claim 5, wherein is provided,
means for selecting from among said second leads,
a plurality of voice generators, each connected to a different one of a third set of leads, and
means for at will connecting the selected ones of said second leads to selected ones of said third leads.

7. The combination according to claim 6, wherein is provided
means for in alternation and automatically connecting said selected ones of said third leads to two of said second leads and for equal time periods to each.

8. The combination according to claim 6, wherein is included
means for counting out groups of four of said ramp wave forms, and
means for generating additional ones of said pulses near the end of each fourth one only of said ramp waves to the exclusion of the preceding three of said ramp waves.

9. The combination according to claim 6 wherein is provided
first means for visually indicating only a first of said pulses occurring during each of said ramp wave forms, and
second means for visually indicating only all of said pulses other than said first of said pulses.

10. The combination according to claim 6 wherein is provided
means including a switch operable for terminating operation of said ramp wave generator instantaneously at will, and for concurrently instantaneously setting said ramp wave generator in condition to initiate a complete ramp wave.

11. The combination according to claim 7 wherein said last means includes
a bistable device,
means transferring said bistable device from one state to the other and from the other state to the one in response to sucessive ones of said ramp wave forms, and
means responsive to the stable state of said bistable device for selecting one or the other of said second leads.

12. The combination according to claim 11 wherein is included means normally returning said bistable device always to only the same one of said states in response to a predetermined control effect.

13. A phantastron wave form generating circuit, including
a pentode having an anode, a first and a second control grid and a screen grid,
a capacitive connection between said screen grid and a point of reference potential,
means applying control pulses to said second control grid,
a cathode follower having a control grid and a cathode,
an anode load connected in series with said anode,
a connection from said anode to said control grid of said cathode follower,
a coupling between said cathode and said first control grid,
means for adjusting the bias of said first control grid to adjust the duration of said wave form, and
wherein is provided
a player controlled musical instrument, and
wherein said last means is automatically responsive to the tempo in which said musical instrument is played by said player.

14. A voice generator, comprising
a source of gating waves,
an amplifier having a first control electrode, a second control electrode and an output electrode,
means connecting said source of gating waves to one of said control electrodes,
a source of plural oscillations of discrete frequencies applied to the other of said control electrodes,
said source of gating waves including a cathode follower,
said cathode follower including an output circuit consisting of a capacitor,
said output circuit being connected directly via a resistive path to said one of said control electrodes.

15. A voice generator, comprising
an amplifier having an output electrode,
a first tone forming circuit connected to said output electrode,
a second tone forming circuit connected to said output electrode in parallel with said first output circuit,
a load circuit,
a first diode gate connected intermediate said first tone forming circuit and said load circuit,
a second diode gate connected intermediate said second tone forming circuit and said load circuit,
said diode gates being oppositely poled, and
means for at will rendering said diode gates selectively conductive.

16. The combination according to claim 15 wherein said gates include
oppositely poled diodes, respectively, and
wherein said last means includes means for selectively applying voltages of opposite polarities to a common junction of said diode gates with said load circuit.

17. In a rhythmic background instrument of the repetitive rhthym type,
means for generating a repetitive pattern of percussive notes,
each of said notes having a duration and the pattern having a duration for each repetition thereof,
control means for controlling the duration of each of the repetitions, and
means for controlling the duration of each of said notes as a direct function of the duration of each of said repetitions.

18. The combination according to claim 17 wherein is provided
a source of control voltage,
means for varying said control voltage, said control means being responsive to said control voltage.

19. The combination according to claim 18 wherein is provided
a player controlled musical instrument, and
wherein is provided means responsive to the tempo in which said player controlled musical instrument is controlled by said player for establishing said control voltage.

20. The combination according to claim 2, wherein said rhythmic patterns correspond with identical accompaniments for each measure of a musical composition.

21. The combination according to claim 2, wherein said rhythmic patterns correspond with identical accompaniments per pair of measures of a musical composition, each measure of each pair being different from the other measure of the pair.

22. The combination according to claim 2, wherein is provided means for modifying said matrix means for selecting on each alternate one of said measure.

23. The combination according to claim 2, wherein is provided means for automatically varying said matrix means for automaticaly selecting diverse rhythms for diverse measures of said musical composition.

24. In a system for controlling the rhythmic pattern of a background instrument of the repetitive rhythm type,
a source of repetitive ramp wave forms,
means for controlling the repetitive rate of said repetitive ramp wave forms, means for deriving pulses in response to selected voltage levels along said repetitive ramp wave forms, matrix means for at will selecting various distinct arrays of said pulses corresponding with rhythmic patterns by selecting conductors of said matrix, wherein is provided means maintaining the maxima and minima of said ramp wave forms at levels and conforming the slopes of said ramp waves according to said repetition rate, and wherein is provided
   a player controlled instrument, and
   means responsive to the tempo of said player controlled instrument for automatically controlling the slopes of said ramp wave forms.

References Cited

UNITED STATES PATENTS

| | | | |
|---|---|---|---|
| 3,140,336 | 7/1964 | Campbell | 84—1.03 |
| 3,243,494 | 3/1966 | Park | 84—1.03 |
| 3,243,714 | 3/1966 | Hekimian | 328—248 |
| 3,310,688 | 3/1967 | Ditkofsky | 307—88.5 |
| Re. 26,333 | 1/1968 | Dalton et al. | 328—182 |
| 3,383,452 | 5/1968 | Park et al. | 84—1.03 |

HERMAN K. SAALBACH, Primary Examiner

T. J. VEZEAN, Assistant Examiner

U.S. Cl. X.R.

84—1.24, 1.26